United States Patent [19]
Hallock

[11] 3,878,756

[45] Apr. 22, 1975

[54] NAIL HAVING WEDGE SPREADABLE LEGS

[76] Inventor: Robert L. Hallock, 7136 N.E. 8th Dr., Boca Raton, Fla. 33432

[22] Filed: Sept. 11, 1973

[21] Appl. No.: 396,286

[52] U.S. Cl. ............................. 85/23; 85/26; 85/31; 85/38; 85/79
[51] Int. Cl.............................................. F16b 15/04
[58] Field of Search .............. 85/31, 26, 38, 85, 68, 85/77, 11, 23, 79

[56] References Cited
UNITED STATES PATENTS

| 1,768,721 | 7/1930 | Taylor | 85/85 |
| 2,089,578 | 8/1937 | Schaefer | 85/85 |
| 2,097,169 | 10/1937 | Wassenbach | 85/85 |
| 2,166,614 | 7/1939 | Strid | 85/85 |
| 2,230,535 | 2/1941 | Fahrenbruch | 85/85 |
| 2,373,983 | 4/1945 | Strid | 85/85 |
| 2,601,803 | 7/1952 | Newman | 85/84 |
| 3,333,499 | 8/1967 | Rudd | 85/26 |

*Primary Examiner*—Edward C. Allen
*Attorney, Agent, or Firm*—Dowell & Dowell

[57] ABSTRACT

Apparatus for attaching covering material on relatively flat roofs to a lightweight roofing material before it is fully hardened. The apparatus includes a body having a pair of legs slidably received within an independent movable head. The head includes a wedge member slidably received within the legs which spreads the legs of the body apart when driven after the wedge has penetrated the roofing material.

6 Claims, 7 Drawing Figures

PATENTED APR 22 1975  3,878,756

NAIL HAVING WEDGE SPREADABLE LEGS

BACKGROUND OF THE INVENTION

1. Field of the Invention

This invention relates generally to fasteners such as nails and the like and relates particularly to fasteners having legs which spread apart when the fastener is driven and remain apart upon withdrawal.

2. Description of the Prior Art

Heretofore many fastening members have been provided for connecting two or more elements in assembled relationship and these fasteners have included nails, screws, staples, rivets, pegs and other such devices. Some of these devices, such as nails and screws, could be driven into the materials to be joined while other devices such as rivets and pegs required that aligned holes or openings be provided for receiving the fasteners. Some self-clinching nails have been provided with a pair of legs connected to a head and in which the legs are adapted to deform and spread apart upon entry into the material. Some examples of these prior art structures are the patents to Shippee et al., U.S. Pat. No. 2,150,788; Jahn U.S. Pat. No. 2,779,229; and Rudd U.S. Pat. No. 3,333,499.

Efforts have been made to improve the insulation qualities of relatively flat roofs and to reduce the weight of roof structures built of concrete or the like by mixing the cement with a lightweight aggregate such as expanded vermiculite, pearlite, or other similar material. The creation of lightweight aggregate roofing materials has introduced new problems in fastening one or more layers of cover material to the lightweight aggregate concrete as well as in testing the strength of the concrete as it hardens.

Ordinary lightweight aggregate roofing material, when properly prepared, sets up and partially hardens in a few hours to a point where a person of ordinary weight can walk across such material without causing indentations, although the material is not yet fully dry and hardened. In this state, water, such as from rain, can weaken the material and retard its achieving full strength. Accordingly, it is desirable to place a protective covering such as a felt building paper impregnated with water-proof material on the exposed surface of the lightweight aggregate as soon after pouring as possible. Such felt building paper cannot be fastened to the material by adhering with tar or asphalt until the moisture has escaped and the material is dry. Any fastener such as a conventional nail can be driven into the lightweight aggregate material; however, a wind, especially one of higher velocity associated with thunderstorms or the like, can raise the covering material and at least partially extract nails having straight and curved shanks. Some efforts have been made to overcome this problem by providing nails having legs which spread apart upon penetration of the material; however, it has been found that such nails have a tendency to be extracted when a withdrawal force is applied to the head since the legs follow the same path which was made upon entry into the material. In applicant's prior U.S. Pat. No. 3,710,672 various inherent difficulties with sheet metal nails driven into lightweight aggregate were overcome; however, some tendency under certain conditions to be extracted along the path of entry may be encountered. The nail of the prior patent ordinarily caused a plug of material to be separated from the remainder of the material and remain within the legs to maintain the legs in spread condition; however, if the plug did not separate from the material and remained stuck thereto, then the legs would follow the same path which was made upon entry, upon attempted withdrawal.

SUMMARY OF THE INVENTION

The present invention is embodied in a sheet metal nail including a body having a pair of substantially rigid outwardly channelled legs connected at one end to an integral bridge. A separately formed sheet metal head member slidably receives the legs of the body and includes a wedge portion which slidably engages with the channel of the legs. Before penetration the head member and wedge portion are so engaged with the legs that relatively slidable movement is prevented. After penetration and the head becoming flush with the surface of the penetrated material, relative movement commences. The legs then slide through the head member into the underlying material and the wedge portion carried by the head acts as a strut and forces the legs apart as they penetrate. When penetration by the nail is complete, the wedge member locks the legs in spread condition so that an upward force on the head cannot retract the legs along the path of entry with the legs moving together.

It is an object of the invention to provide a sheet metal nail having a pair of substantially non-bendable legs and a wedge member for spreading the legs apart during penetration and locking the legs in spread condition when penetration is completed.

Another object is a nail of the type described having means to keep the parts from moving relative to each other during shipment.

Another object is a nail of the type described having means to keep the parts from moving relative to each other when the nail is driven until the head is flush with the roofing material.

Another object is a nail of the type described having wedge means positioned to force and maintain the legs apart so that no void is present between the outside surface of the legs and the roofing material.

Another object is a nail of the type described having wedge means which force the legs apart at a rate that maintains compression between the outer surface of the legs and the roofing material, thereby eliminating yielding of the nail on withdrawal.

DESCRIPTION OF THE PREFERRED EMBODIMENT

Figure 1:
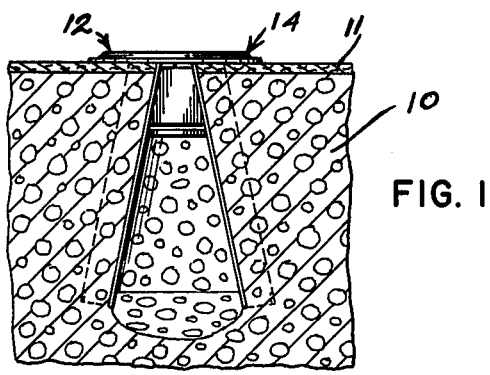
FIG. 1 is a vertical section illustrating one application of the invention.
Figure 3:
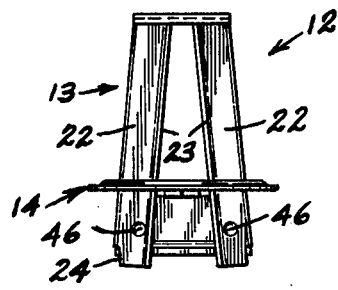
FIG. 3 is a side elevation of the nail prior to being driven.

With continued reference to the drawing, a lightweight aggregate material 10 is provided on which a waterproof covering material 11 is to be attached. In order to mount the covering material 11 on the aggregate material 10, a sheet metal nail 12 is provided having a body member 13 and separately formed head member 14.

Figure 4:
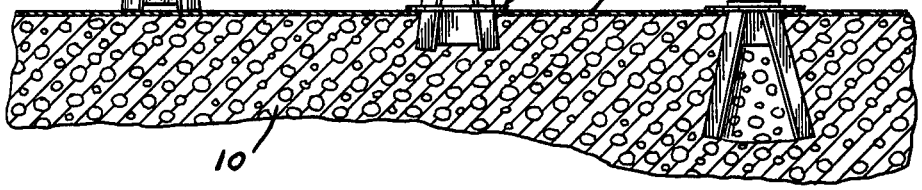
FIG. 4 is a flat layout of the legs.

The body member 13 (FIG. 4) is constructed of sheet material and in flat layout includes a central bridge 15 of reduced width and having a predetermined length. A wider leg forming portion 16 is integrally connected to each end of the bridge and extends outwardly therefrom. To form relatively rigid legs, each of the leg portions 16 is provided with a pair of longitudinally extending outer bend lines 17 substantially in alignment with the edges of the central bridge 15. The portions outwardly of the bend line 17 are initially bent upwardly so that such portions are substantially at right angles to the plane of the blank. A pair of generally parallel inner bend lines 18 are disposed generally centrally of each of the leg portions 16 with the area between such bend lines subsequently being curved substantially to a half circle.

Bend lines 19 separate each leg portion 16 from the central bridge 15. A pair of bend lines 20 and 21 extend from the center of the bend lines 19 at an angle of approximately 45° to the longitudinal center line and terminate at the edges of the central bridge 15.

Figure 7:
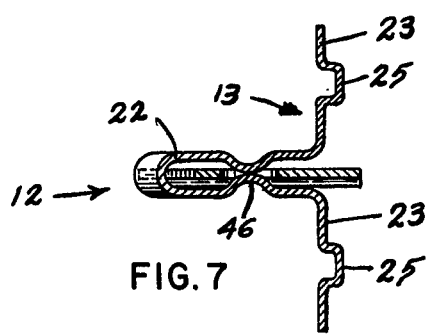
FIG. 7 is an enlarged section on the line 7—7 of FIG. 6.

In order to form the legs, the corners of the central bridge 15 outwardly of bend lines 20 and 21 are bent downwardly along such bend lines, while simultaneously each of the leg portions 16 is bent downwardly along the inner bend lines 18 and upwardly along the connecting bend lines 19. This results in each leg having a central substantially U-shaped portion 22 disposed in a plane along the longitudinal center of the body member. The U-shaped portions are open toward each other and the outer extremity of each U-shaped portion is located at one end of the bridge 15. Each of the arms of the U-shaped portions 22 is integrally connected to an outwardly extending flange 23 in such a manner that the U-shaped portion and the flanges mutually reinforce each other. The upper ends of the U-shaped portion 22 are integrally connected to the central bridge 15 along the bend lines 19. An inwardly extending notch 24 is provided between the inner bend lines 18 and such notches extend inwardly from the outer edges of the leg portions 16. If desired a reinforcing rib 25 (FIG. 7) can be offset from the lower portion of each flange 23 to provide additional rigidity.

The head member 14 is made of sheet material and includes a generally circular upper portion 28 having a circular reinforcing rib 29 adjacent to its periphery. A tongue 30 is integrally connected at one end to the edge of the circular upper portion 28 along a bend line 31 and such tongue has a length equal substantially to the radius of such circular portion. The opposite end of the tongue is integrally connected along a bend line 32 to a wedge portion 33.

The wedge portion 33 has generally straight upper and lower edges 34 and 35, respectively and downwardly and outwardly angled side edges 36 generally in the form of a trapezoid. By selecting the appropriate angle and width for the sides 36, a compressive force can be maintained between the outer surface of the legs and the roofing material 10. In one embodiment, the side 35 has a dimension of 0.860 inch and the sides 36 form an angle of 30°. The side edges 36 of the wedge portion are spaced apart a distance greater than the distance between the outer extremities of the facing U-shaped portions at the point of connection thereof with the bridge 15.

Figure 6:
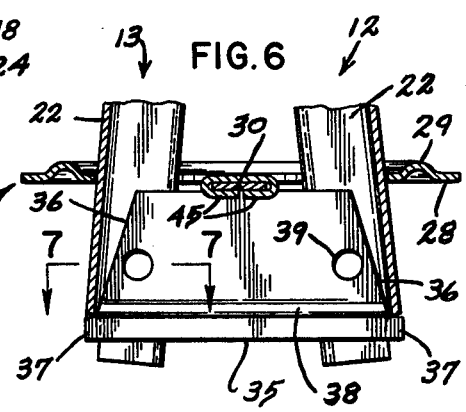
FIG. 6 is an enlarged vertical section of the penetrating end of the nail.

At the intersection of the side edges 36 and the lower edge 35 a relatively small outwardly extending tang 37 is provided for a purpose which will be described later. The tank 37 may be of any desired size; however, a width of approximately 0.100 inch and a length extending outwardly from the side edges 36 a distance of approximately 0.015 inch have been found satisfactory. If desired the wedge portion 33 may have a reinforcing rib 38 (FIGS. 5 and 6) extending from one side edge to the other. The wedge portion 33 is provided with an opening 39 adjacent each of the side edges 36 for a purpose to be described later.

The circular portion 28 of the head member 14 is provided with a pair of opposed T-shaped leg receiving openings 42 spaced from each other. The cross portion 43 of each T is in spaced parallel relationship with each other, while the base portion 44 extends outwardly in opposite directions and generally in alignment with each other. The material of the base portion 44 of each opening is removed, while the material at each side of the cross portions 43 is bent downwardly to provide generally parallel tabs 45 disposed generally normal to the circular portion 28.

Figure 5:
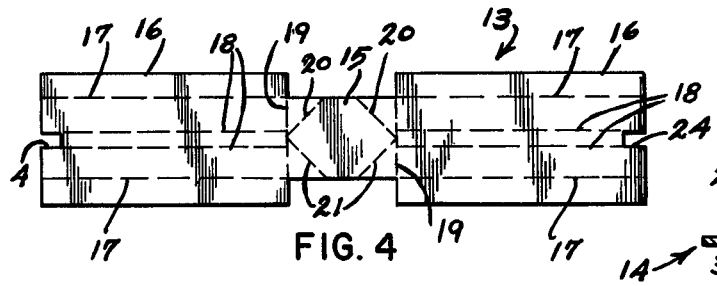
FIG. 5 is a flat layout of the head member.

After the head member 14 has been stamped to the configuration illustrated in FIG. 5, the tongue 30 is bent substantially 180° along the bend line 31 so that the tongue underlies and is adjacent to the circular portion 28. Thereafter the wedge portion 33 is bent downwardly along the bend line 32 at an angle of approximately 90° so that the upper edge of the wedge portion is located adjacent to the circular portion 28 and the wedge portion projects downwardly normal to the plane of such circular portion. Since the length of the tongue 30 is substantially equal to the radius of the circular portion 28, the wedge portion 33 is located substantially in alignment with the base portions 44 of the openings 42 in the circular portion of the head. In this position the tabs 45 are bent inwardly toward each other so that one pair of tabs clamps the tongue 30 adjacent to the wedge portion 33 to hold the wedge portion in position.

Figure 2:
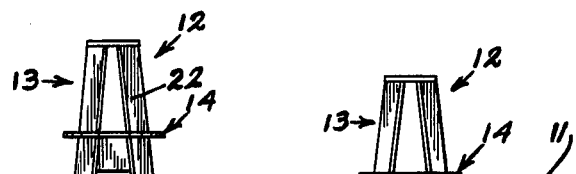
FIG. 2 is a diagrammatic representation illustrating the steps of penetration of the nail into lightweight aggregate material.

The body member 13 is assembled with the head member 14 by inserting the legs 16 through the T-shaped openings 42 in the head member so that the wedge portion 33 is slidably received within the U-shaped portions 22 of the legs. The legs are moved through the T-shaped openings until the notches 24 in the leg portions engage the tangs 37 at the lower end of the wedge portion 33. When the nail is used, the tangs resist movement of the legs through the head member and past the wedge portion until the lower surface of the head engages the aggregate material. At this point the head and wedge portion are held by the material from further movement and the legs override the tangs and penetrate further into the material. Through the structure described the legs do not begin to spread until the head is flush, as shown in FIG. 2; further driving spreads the legs against the wedge until penetration is complete. If the tangs were not provided, initial driving of the legs may cause penetration of the legs but without simultaneous penetration of the wedge until the head is at the top of the nail. Further driving would then further spread the legs outwardly and out of contact with the wedge, thereby leaving a space through which the legs could begin to move together upon attempted withdrawal without being held apart by the wedge. This would be a weaker joint than with the preferred embodiment by letting the nail be slightly removed before the wedge held the legs apart.

In order to maintain the body member 13 and head member 14 in assembled relationship until use, at least one side of each of the U-shaped portions 22 is provided with an inwardly extending dimple 46 substantially in alignment with the opening 39 in the wedge member in such a manner that the inwardly extending dimple is received within the opening. This prevents inadvertent withdrawal of the body member from the head member, as for example, during shipment.

In the operation of the device, after the aggregate material 10 has set hard enough to support the weight of a person, the covering material 11 is placed on the aggregate material 10 and a plurality of nails 12 are applied to hold the covering material in position. As illustrated at the left of FIG. 2, the head member 14 of the nail is spaced a substantial distance from the bridge 15 of the body and with the lower edge 35 of the wedge portion adjacent to the lower edge of each of the legs 16. In this position the nail is struck with an impact tool such as a hammer or the like (not shown) and the lower portion of the nail penetrates the material until the circular portion 28 of the head member engages the covering material 11 as shown at the center of FIG. 2. The circular portion 28 resists further downward movement of the head member 14 and further downward movement of the body member 13 causes the legs to override the tangs 37. Continued downward movement of the body member 13 causes the substantially rigid legs 16 to be spread apart by the wedge portions 33 until the bridge 15 of the body member 13 engages the circular portion 28 of the head member 14, as illustrated at the right in FIG. 2. In this position a force tending to move the covering material 11 upwardly is resisted by the aggregate material engaging the outer surfaces of the legs 16. Since the wedge portion 33 locks the leg 16 in spread-apart condition, such legs cannot be withdrawn through the opening made upon entry into the aggregate material.

What is claimed is:

1. A sheet metal nail comprising a body and a separate head, said body including a pair of substantially rigid legs having generally U-shaped portions, each of said U-shaped portions having reinforcing flanges extending therefrom, bridge means integrally connected to one end of each of said legs and spacing said legs a predetermined distance apart, said head including an upper planar portion having spaced opposed T-shaped openings therein, wedge means connected to the under portion of said head and extending downwardly generally normal thereto, said wedge means having downwardly and outwardly inclined sides in alignment with portions of said openings, the sides of said wedge means being spaced apart a distance greater than the distance between said legs at said bridge means, said T-shaped openings slidably receiving the legs of said body, the U-shaped portions of said legs slidably receiving the side edges of said wedge means, and cooperating means on said wedge means and said legs for maintaining said head in spaced relationship to said bridge means until the nail is driven, whereby movement of said body through the openings of said head causes the wedge means to spread the legs apart.

2. A fastener constructed of sheet metal for attaching a covering material to a hardenable semi-plastic building material comprising a body member and a head member, said body member including a pair of rigid substantially non-bendable legs having opposed generally U-shaped portions, bridge means connecting one end of each of said legs together in spaced relationship, said head member including an upper generally flat portion having spaced leg receiving openings, an elongated wedge member carried by said upper portion and extending downwardly generally normal thereto, said wedge member being disposed in alignment with at least portions of said openings and having opposite ends spaced apart a distance greater than the distance between said legs at said bridge means, said opposite ends of said wedge member being received within the U-shaped portions of said legs for guiding said legs during relative movement, and cooperating means on said wedge member and the other ends of said legs for maintaining said head member in assembled relationship with said body member and spaced from said bridge means until the fastener is driven, whereby when the fastener is driven said wedge member and the other ends of said legs penetrate the semi-plastic material until said upper portion of said head member engages the material and said cooperating means is released so that said wedge member causes the legs to spread apart from each other upon further penetration into the material.

3. The structure of claim 2 in which said cooperating means on said wedge member and the other ends of said legs includes at least one opening extending through said wedge member and a dimple extending inwardly from at least one of said legs and selectively receivable within the opening of said wedge member.

4. The structure of claim 2 in which said cooperating means on said wedge member and the other ends of said legs includes outwardly extending tangs at opposite ends of said wedge member in a position to engage said other ends of said legs until said upper portion of said head member engages the material whereupon said other ends of said legs override said tangs.

5. The structure of claim 2 in which said upper portion of said head member is of generally circular configuration.

6. The structure of claim 2 in which each of said U-shaped portions of said legs is provided with a flange extending outwardly generally perpendicular thereto.

* * * * *